US007598455B2

(12) United States Patent
Gump et al.

(10) Patent No.: US 7,598,455 B2
(45) Date of Patent: Oct. 6, 2009

(54) SHIELDED ELECTRIC CABLE ASSEMBLY AND METHOD

(75) Inventors: Bruce S. Gump, Warren, OH (US); David A. Beck, El Paso, TX (US); Linda F. Gibbons, Warren, OH (US); Harry J. Minor, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/712,720

(22) Filed: Mar. 1, 2007

(65) Prior Publication Data

US 2008/0214049 A1 Sep. 4, 2008

(51) Int. Cl.
*H02G 15/06* (2006.01)

(52) U.S. Cl. .................................. 174/75 C; 174/84 C

(58) Field of Classification Search ............... 174/75 C, 174/78, 84 C

See application file for complete search history.

(56) References Cited

U.S. PATENT DOCUMENTS 5,468,911 A * 11/1995 Leve et al. ................ 174/74 R
5,962,812 A * 10/1999 Miyazaki ..................... 174/78
6,107,572 A * 8/2000 Miyazaki .................. 174/75 C
6,257,931 B1 7/2001 Sakurai et al.
6,452,102 B1 * 9/2002 DeForest et al. .......... 174/75 C
6,554,623 B2 4/2003 Yoshioka
6,659,780 B2 12/2003 Parkinson et al.
6,749,464 B2 6/2004 Obata
6,796,838 B2 9/2004 Yoshioka
2004/0229508 A1 11/2004 Miyazaki et al.

OTHER PUBLICATIONS

U.S. Appl. No. 11/365,305, filed Mar. 1, 2006, George; Terry A., et al.

* cited by examiner

*Primary Examiner*—Chau N Nguyen
(74) *Attorney, Agent, or Firm*—Thomas N. Twomey

(57) ABSTRACT

A shielded electric cable assembly comprises a shielded electric cable and a shield terminal. The shield terminal comprises an inner ferrule and an outer ferrule. The inner ferrule is disposed between an inner insulation jacket of shielded electric cable and an exposed end portion of a conductive layer surrounding the inner insulation jacket. The outer ferrule is crimped about the exposed end portion of the woven metal shield to clamp exposed end portion of the conductive layer between the inner ferrule and the outer ferrule. The material of the outer ferrule is harder than the material of the inner ferrule so that crimped outer ferrule interlocks with the inner ferrule in the longitudinal direction.

12 Claims, 2 Drawing Sheets

SHIELDED ELECTRIC CABLE ASSEMBLY AND METHOD

BACKGROUND OF THE INVENTION

This invention relates generally to a shielded electric cable assembly and a method of making a shielded electric cable assembly.

A shielded electric cable assembly generally comprises a shielded electric cable that has a conductor core that is surrounded by an inner insulation jacket, an intermediate conductive layer, and an outer insulation jacket. A shield terminal is attached to the conductive layer. The conductive layer and shield terminal shield any electronic devices in the vicinity of the shielded electric cable assembly from electromagnetic interference (generally designated EMI) caused by electric current flowing through the conductive core. An inner terminal is usually but not necessarily attached to the conductor core as part of the assembly for making an electrical connection to a mating terminal. The shield terminal of the assembly may include an enlarged conductive shell for shielding the inner terminal and any exposed end portion of the conductor core.

A common shielded electric cable has an intermediate conductive layer in the form of a metallic braid that is woven around the inner insulation jacket. One common inner terminal that may be used in the assembly includes core and insulation crimp wings which are attached to an electric cable in a well known manner in which the core crimp wings are crimped around an exposed end portion of the conductive core while the insulation crimp wings are crimped around the insulation jacket which in the case of a shielded electric cable is an exposed end portion of the inner insulation jacket. Another common inner terminal is an insulation displacement terminal that includes insulation piercing portions for contacting the conductive core without any need for removing an insulation jacket.

U.S. Pat. No. 6,257,931 B1 issued to Kazuaki Sakurai et al. Jul. 10, 2001, discloses a shielded electric cable assembly in FIG. 1. The shielded electric cable assembly comprises a shielded electric cable 2, an inner terminal 4 that is attached to an exposed end portion of a conductor core 3 of the shielded electric cable 2. A shielding terminal 7 is attached to an exposed end portion of a shielding mesh 6 and to an outer insulation jacket 19 of the shielded electric cable 2. The shielded electric cable assembly also includes an inner housing 5 of insulation material to space the inner terminal 4 from the outer shielding terminal 7.

U.S. Pat. No. 6,554,623 B2 issued to Nobuaki Yoshioka Apr. 29, 2003, discloses a shielded electric cable connection in which a shielded electric cable 9 has a terminal that is attached to an exposed end portion of the conductive core and to an exposed end portion of the inner insulation jacket of the shielded electric cable 9. An exposed end portion of the metallic braid 10 is connected to a metal shell 8 by a shield terminal 34 that has a cylindrical part 32 that is caulked to the exposed metallic braid 10.

U.S. patent application Ser. No. 11/365,505 filed Mar. 1, 2006, discloses a shielded electric cable connection in which a shielded electric cable 18 has a terminal 40 that is attached to an exposed end portion of the conductive core 20 and to an exposed end portion of the inner insulation jacket 22 of the shielded electric cable 18. An exposed end portion of the metallic braid 14 is connected to a metal shell 44 by a metal annulus 46 and a clamp ring 48 that is attached to the inner insulation jacket under the exposed end portion of the metallic braid 14.

SUMMARY OF THE INVENTION

In one aspect, a shielded electric cable assembly comprising a shielded electric cable and a shield terminal is provided. The shielded electric cable has a conductive core, an inner insulation jacket surrounding the conductive core, a conductive layer surrounding the inner insulation jacket and an outer insulation jacket surrounding the conductive layer. The shield terminal comprises an inner ferrule and an outer ferrule that is disposed coaxially between the inner insulation jacket and an exposed end portion of the conductive layer. The inner ferrule grips the inner insulation jacket frictionally, and the outer ferrule is disposed coaxially about the exposed end portion of the conductive layer and coaxially interlocked with the inner ferrule portion with the end portion of the conductive layer being trapped tightly between the inner ferrule and the outer ferrule.

The inner ferrule is preferably made of a first material and the outer ferrule portion may be a separate member that is preferably made of a second material that is harder than the first material.

The conductive layer may be a metallic braid that is woven around the inner insulation jacket and the end portion of the metallic braid may be driven into the inner ferrule when the outer ferrule is crimped.

In another aspect, a method of making a shielded electric cable assembly comprising a shielded electric cable and a shield terminal is provided. The method comprises the steps of providing a shielded electric cable having a conductive core, an inner insulation jacket surrounding the conductive core, a conductive layer surrounding the inner insulation jacket and an outer insulation jacket surrounding the conductive layer and providing a shield terminal comprising an inner ferrule and an outer ferrule. An end portion of the conductive layer is exposed and flared. The inner ferrule and the outer ferrule are positioned coaxially on the shielded electric cable so that the inner ferrule is between the inner insulation jacket and the end portion of the conductive layer and the outer ferrule is around the end portion of the conductive layer and radially outward of the inner ferrule with the end portion of the conductive layer between the inner ferrule and the outer ferrule. The outer ferrule is crimped about the end portion of the conductive layer so that the inner ferrule grips the inner insulation jacket frictionally and outer ferrule is interlocked axially with the inner ferrule with the end portion of the conductive layer trapped tightly between the inner ferrule and the outer ferrule.

In the method, the inner ferrule is preferably made of a first material and the outer ferrule portion may be a separate member that is preferably made of a second material that is harder than the first material.

In the method, the conductive layer may be a metallic braid that is woven around the inner insulation jacket and the end portion of the metallic braid may be driven into the inner ferrule when the outer ferrule is crimped.

DETAILED DESCRIPTION OF THE PREFERRED EMBODIMENTS

Figure 1:
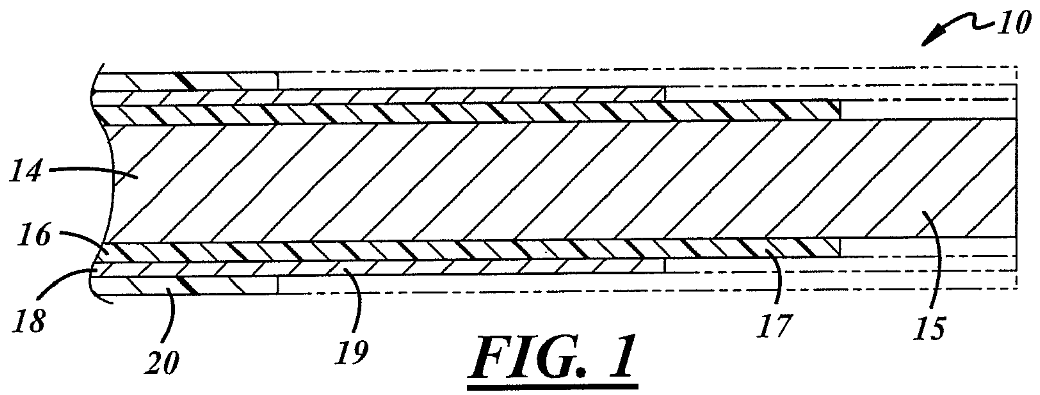
FIG. 1 is a side view of a shielded electric cable that has been prepared for attachment of a shield terminal

Referring now to the drawings, FIG. 1 shows a shielded electric cable 10 that has been prepared for attachment of a shield terminal. The shielded electric cable 10 has a conductive core 14, an inner insulation jacket 16 surrounding the conductive core 14, a intermediate conductive layer 18 surrounding the inner insulation jacket and an outer insulation jacket 20 surrounding the intermediate conductive layer 18.

To prepare the shielded electric cable 10 for attachment of the shield terminal 12, the end portion of the shielded electric cable 10 is cut circumferentially at three axially spaced locations with the cuts successively deeper into the cable so that the portions shown in dashed line in FIG. 1 can be stripped away.

The first cut, which is furthest from the end of the cable, is through the outer insulation jacket 20 so that an elongate end portion shown in dashed line FIG. 1 can be stripped away to provide an exposed end portion 19 of the conductive layer 18. The second cut extends through the conductive layer so that the end portion shown in dashed line in FIG. 1 can be stripped away to provide an exposed end portion 17 of the inner insulation jacket 16. The third cut, which is closest to the end of the cable extends through the inner insulation jacket so that the end portion shown in dashed line in FIG. 1 can be stripped away to provide and exposed end portion 15 of the conductive core 14.

The first, second and third cuts may be made simultaneously or successively. Furthermore, the third cut may not be necessary in all cases, for instance when an insulation piercing inner terminal is used as explained more fully below. Moreover, even if the third circumferential cut is made, the end portion of the inner insulation jacket may be removed after the shield terminal is attached as more fully explained below.

Figure 2:
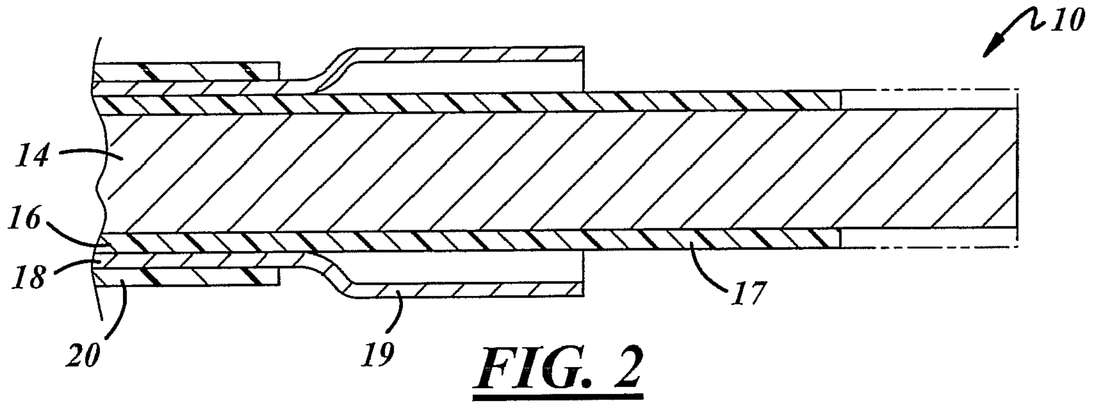
FIGS. 2 and 3 are side views of the shielded electric cable of FIG. 1 and a shield terminal in the process of being applied to the shielded electric cable.

After the shielded electric cable 10 is prepared as discussed above, the exposed end portion 19 of the conductive layer 18 is flared to space it from the exposed end portion 17 of the inner insulation jacket 16, as shown in FIG. 2. The shielded electric cable 10 is now prepared for attachment of the shield terminal 12. It should be noted that the end portion of the conductive core 14 need not be exposed at this time. In fact it may be preferable for the inner insulation to be left intact for assisting in attaching the shield terminal 12 to the cable 10 and/or for providing the option of using an insulation piercing type inner terminal.

Figure 3:
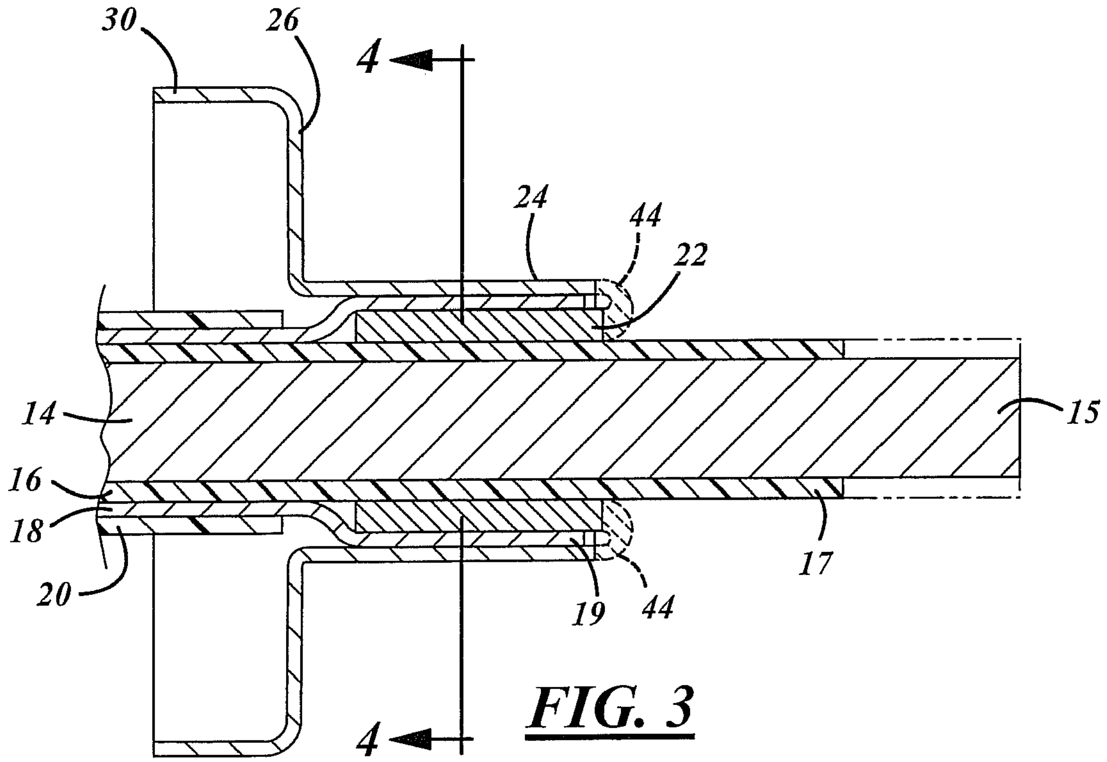
Figure 4:
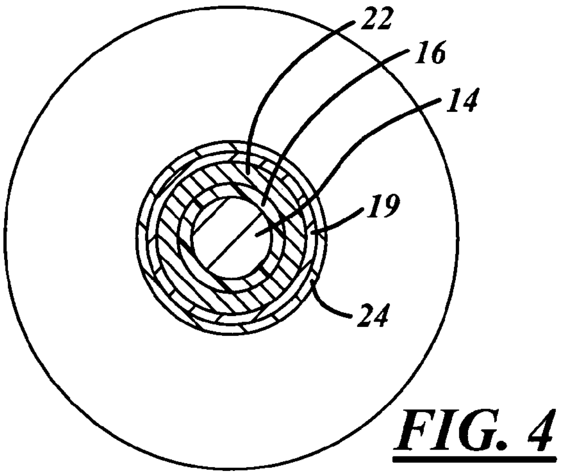
FIG. 4 is a section taken substantially along the line 4-4 of FIG. 3 looking in the direction of the arrows.

Referring now to FIGS. 3 and 4, the shield terminal 12 comprises an inner ferrule 22 and an outer ferrule 24. Inner ferrule 22 and outer ferrule 24 are both made of electrically conductive materials, however, inner ferrule 22 is made of a softer material as explained more fully below. The outer ferrule 24 is radially spaced from the inner ferrule 22 and may include an enlarged flange 26 at end 30 as explained below.

After the end portion of the shielded electric cable 10 is prepared as explained in connection with FIGS. 1 and 2, the exposed end portion 17 of the inner insulation jacket 16 is then threaded into the inner ferrule 22 of the shield terminal 12 until the inner ferrule 22 is disposed between the exposed end portion 17 of the inner insulation jacket 16 and the flared end portion 19 of the conductive layer 18 as shown in FIGS. 3 and 4. As indicated above, the inner insulation 16 may still be intact and covering the conductive core 14 in order to assist in moving the inner ferrule 22 into position between the inner insulation jacket 17 and the flared exposed end portion 19 of the conductive layer 18. Leaving the inner insulation layer intact also provides an option for using an insulation displacement type inner terminal as explained below.

Figure 6:
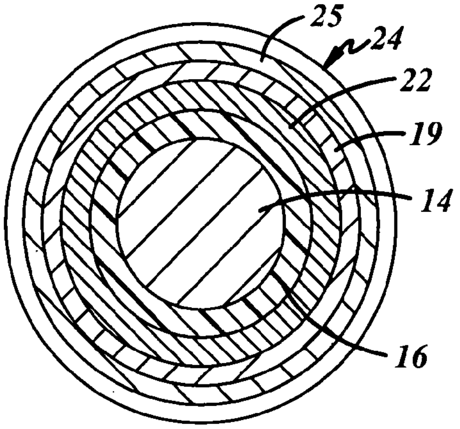
FIG. 6 is a section taken substantially along the line 6-6 of FIG. 5 looking in the direction of the arrows.
Figure 5:
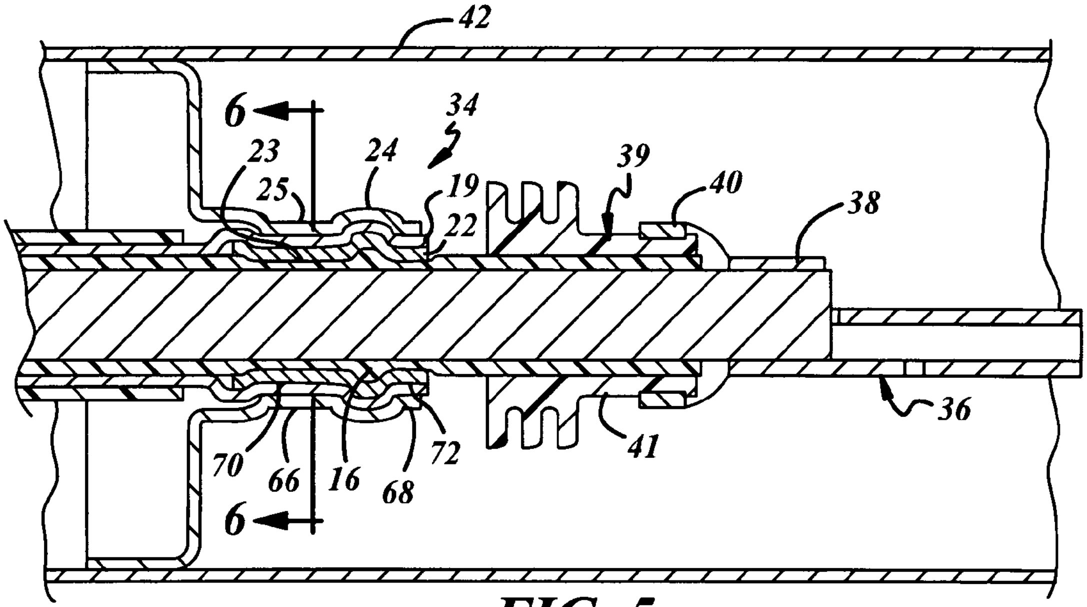
FIG. 5 is a side view of the shielded electric cable and the shield terminal of FIGS. 2 and 3 with the shield terminal shown applied to the shielded electric cable and showing an inner terminal applied to the conductive core of the shielded electric cable.
Figure 7:
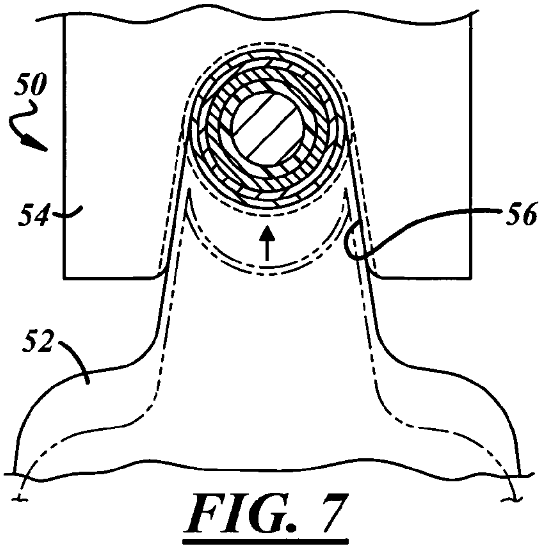
FIG. 7 is a front view of crimping tools for applying the shield terminal to the shielded electric cable.
Figure 8:
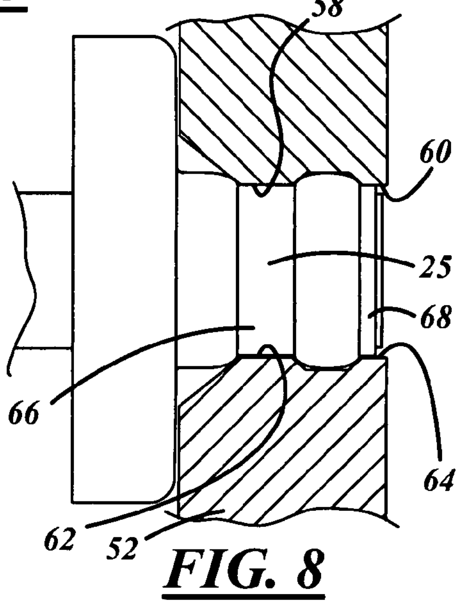
FIG. 8 is a section of the crimping tools of FIG. 7 taken substantially along the line 8-8 of FIG. 7 looking in the direction of the arrows.

After the inner ferrule portion 22 is in position between the inner insulation jacket 17 and the flared exposed end portion 19 of the conductive layer 18, the outer ferrule 24 is then positioned around the flared end portion 19 of conductive layer 18 in longitudinal alignment with the inner ferrule 22 as shown in FIGS. 3 and 4. The outer ferrule 24 is then crimped radially inwardly about the flared end portion 19 of the conductive layer 18 to crimp the inner ferrule 22 tightly against the end portion 17 of the inner insulation jacket 16 and to clamp the flared end portion 19 of the conductive layer 18 between the inner ferrule 22 and the outer ferrule 24 as shown in FIGS. 5 and 6. FIGS. 7 and 8 show crimping tools 50 that may be used for this purpose.

Typical crimping tools 50 for applying the shield terminal 12 to the shielded electric cable 10 are shown in FIGS. 7 and 8. Crimping tools 50 comprise an anvil 52 and a plate 54 having a slot 56 for receiving anvil 52 as best shown in FIG. 7. Slot 56 has an open bottom with side walls that converge to form substantially semi-cylindrical upper forming surfaces 58 and 60 that are spaced apart in the longitudinal direction as best shown in FIG. 8. Anvil 52 which is typically raised and lowered by a hydraulic press (not shown), has lower substantially semi-circular, longitudinally spaced forming surfaces 62 and 64. Surfaces 62 and 64 cooperate with upper forming surfaces 58 and 60 forming circumferential crimps 66 and 68 in outer ferrule 24 when anvil 52 is raised from the phantom line position to the solid line position shown in FIG. 7. Inner ferrule 22 is also deformed radially inwardly at 70 and 72 because of its softer nature as best shown in FIG. 5.

As indicated above, the inner ferrule 22 is made of a softer electrically conductive material that the outer ferrule 24. For example the inner ferrule may be made of copper, while the outer ferrule 24 may be made of brass. Suitable material for the inner ferrule 22 include copper, zinc, tin brass, bronze or a suitable plastic material and may or may not be plated with tin, silver or gold while suitable materials for the outer ferrule 24 include brass, copper, bronze and may or may not be plated with tin, silver or gold any of which may be used with any of the materials listed for the inner ferrule 22 so long as the combination of materials produce the result described below.

The outer ferrule 24 is crimped with sufficient force so that the mid portion 25 deforms radially inwardly and deforms the mid portion 23 of the inner ferrule 22 radially inwardly creating an interlock between the inner and the outer ferrules 22 and 24 in the longitudinal direction as shown in FIG. 8.

The outer ferrule 24 is also preferably crimped with sufficient force so that the mid portion 23 of the inner ferrule 22 embeds in the end portion 16 of the inner insulation jacket 16 that is inwardly of the flared end portion 19 of the conductive layer 18 as shown in FIG. 5.

This provides a basic shielded electric cable assembly 34 of the invention. However as shown in FIG. 5, the basic shielded cable assembly 34 may then be enhanced or supplemented by including an inner terminal 36 of any suitable type. The inner terminal 36 which is illustrated is a typical female terminal having core and insulation crimp wings 38 and 40 which are crimped about the exposed end portion 15 of the conductor core 14 and an elastomeric cable seal 39 surrounding the exposed end portion 17 of the inner insulation jacket 16, respectively. Use of this type of conventional terminal requires the third cut described above wherein the inner insulation jacket 16 is cut through and an elongate end portion removed to provide the exposed end portion 15 of the conductor core 14. As indicated above, the inner insulation jacket 17 can be left intact if an insulation displacement type terminal is attached to the cable 10 as part of the shielded electric cable assembly 34.

When used in a sealed electrical connector, the shielded electric cable assembly 34 includes cable seal 39 that has a collar 41 that is clamped around the end portion 17 of the inner insulation jacket 16 by the insulation crimp wings 40 in a well known manner. However, cable seal 39 can be eliminated for non-sealed applications.

The shielded electric cable assembly 34 can also be enhanced or supplemented by a shell 42 that extends past the inner terminal 36. Shell 42 is pressed onto or otherwise suitably secured to the enlarged flange 26 of the outer ferrule 24 of the shield terminal 12.

While the inner ferrule 22 and the outer ferrule 24 are shown as separate pieces the inner ferrule 22 and the outer ferrule 24 may be made as one integral piece that are joined by an end wall 44 that is shown in phantom in FIG. 3 so long as the inner ferrule 22 is softer than the outer ferrule 24 and so long as the inner ferrule 22 and the outer ferrule 24 can be positioned as shown in FIG. 3 where the flared end 19 of the conductive layer 18 is positioned between the inner ferrule 22 and the outer ferrule 24.

The shielded electric cable assembly 34 may use a shielded electric cable 10 wherein the intermediate conductive layer 19 is a metallic mesh that is woven around the inner insulation layer 17 or a metal foil or a plastic braid that is coated with a conductive surface. The inner ferrule 22, outer ferrule 24 and the optional shell 42 are preferably made of any conductive material that is easily formed such as sheet metal.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A method of making a shielded electric cable assembly comprising a shielded electric cable and a shield terminal comprising the steps of:

providing a shielded electric cable having a conductive core, an inner insulation jacket surrounding the conductive core, a conductive layer surrounding the inner insulation jacket and an outer insulation jacket surrounding the conductive layer, providing a shield terminal comprising an inner ferrule and an outer ferrule wherein the inner ferrule is made of a first material and the outer ferrule is a separate member that is made of a second material that is harder than the first material, exposing and flaring an end portion of the conductive layer, positioning the inner ferrule and the outer ferrule coaxially on the shielded electric cable so that the inner ferrule is between the inner insulation jacket and the end portion of the conductive layer and the outer ferrule is around the end portion of the conductive layer and radially outward of the inner ferrule with the end portion of the conductive layer between the inner ferrule and the outer ferrule, and crimping the outer ferrule about the end portion of the conductive layer so that the inner ferrule grips the inner insulation jacket frictionally and outer ferrule is interlocked axially with the inner ferrule with the end portion of the conductive layer trapped tightly between the inner ferrule and the outer ferrule.

2. The method as defined in claim 1 wherein the conductive layer is selected from the group consisting of a metallic mesh that is woven around the inner insulation jacket, a metal foil, and a plastic braid that is coated with a conductive surface.

3. The method as defined in claim 1 wherein the conductive layer is a metallic mesh that is woven around the inner insulation jacket and wherein the end portion of the metallic mesh is driven into the inner ferrule when the outer ferrule is crimped.

4. A shielded electric cable assembly comprising a shielded electric cable and a shield terminal, the shielded electric cable having a conductive core, an inner insulation jacket surrounding the conductive core, a conductive layer surrounding the inner insulation jacket and an outer insulation jacket surrounding the conductive layer, the shield terminal comprising an inner ferrule and an outer ferrule wherein the inner ferrule is made of a first material and the outer ferrule is a separate member that is made of a second material that is harder than the first material, the inner ferrule being disposed coaxially between the inner insulation jacket and an exposed end portion of the conductive layer, the inner ferrule gripping the inner insulation jacket frictionally, and the outer ferrule being disposed coaxially about the exposed end portion of the conductive layer and coaxially interlocked with the inner ferrule portion with the end portion of the conductive layer being trapped tightly between the inner ferrule and the outer ferrule.

5. The shielded electric cable assembly as defined in claim 4 wherein the conductive layer is selected from the group consisting of a metallic mesh that is woven around the inner insulation jacket, a metal foil, and a plastic braid that is coated with a conductive surface.

6. The shielded electric cable as defined in claim 4 wherein the conductive layer is a metallic mesh that is woven around the inner insulation jacket and wherein the end portion of the metallic mesh is driven into the inner ferrule when the outer ferrule is crimped.

7. A method of making a shielded electric cable assembly comprising a shielded electric cable and a shield terminal comprising the steps of:

providing a shielded electric cable having a conductive core, an inner insulation jacket surrounding the conductive core, a conductive layer surrounding the inner insulation jacket and an outer insulation jacket surrounding the conductive layer, providing a shield terminal comprising an inner ferrule portion and an outer ferrule portion wherein the inner ferrule portion is made of a first material and the outer ferrule portion is made of a second material that is harder than the first material, said inner ferrule portion being contiguous and uniform about its entire circumference and said outer ferrule portion being contiguous and uniform about its entire circumference, exposing and flaring an end portion of the conductive layer, positioning the inner ferrule portion and the outer ferrule portion coaxially on the shielded electric cable so that the inner ferrule portion is between the inner insulation jacket and the end portion of the conductive layer and the outer ferrule portion is around the end portion of the conductive layer and radially outward of the inner ferrule portion with the end portion of the conductive layer between the inner ferrule portion and the outer ferrule portion, and crimping the outer ferrule portion about the end portion of the conductive layer so that the inner ferrule portion grips the inner insulation jacket frictionally and outer ferrule portion is interlocked axially with the inner ferrule portion with the end portion of the conductive layer trapped tightly between the inner ferrule portion and the outer ferrule portion.

8. The method as defined in claim 7 wherein the conductive layer is selected from the group consisting of a metallic mesh that is woven around the inner insulation jacket, a metal foil, and a plastic braid that is coated with a conductive surface.

9. The method as defined in claim 7 wherein the conductive layer is a metallic mesh that is woven around the inner insulation jacket and wherein the end portion of the metallic mesh is driven into the inner ferrule when the outer ferrule is crimped.

10. A shielded electric cable assembly comprising a shielded electric cable and a shield terminal, the shielded electric cable having a conductive core, an inner insulation jacket surrounding the conductive core, a conductive layer surrounding the inner insulation jacket and an outer insulation jacket surrounding the conductive layer, the shield terminal comprising an inner ferrule portion and an outer ferrule portion wherein the inner ferrule portion is made of a first material and the outer ferrule portion is made of a second material that is harder than the first material, said inner ferrule portion being contiguous and uniform about its entire circumference, said outer ferrule portion being contiguous and uniform about its entire circumference, the inner ferrule portion being disposed coaxially between the inner insulation jacket and an exposed end portion of the conductive layer, the inner ferrule gripping the inner insulation jacket frictionally, and the outer ferrule being disposed coaxially about the exposed end portion of the conductive layer and coaxially interlocked with the inner ferrule portion with the end portion of the conductive layer being trapped tightly between the inner ferule and the outer ferrule.

11. The shielded electric cable assembly as defined in claim 10 wherein the conductive layer is selected from the group consisting of a metallic mesh that is woven around the inner insulation jacket, a metal foil, and a plastic braid that is coated with a conductive surface.

12. The shielded electric cable as defined in claim 10 wherein the conductive layer is a metallic mesh that is woven around the inner insulation jacket and wherein the end portion of the metallic mesh is driven into the inner ferrule when the outer ferrule is crimped.

* * * * *